United States Patent [19]

Peil

[11] 3,742,130

[45] June 26, 1973

[54] TELEVISION RECEIVER INCORPORATING SYNCHRONOUS DETECTION

[75] Inventor: Willaim Peil, N. Syracuse, N.Y.

[73] Assignee: General Electric Company, Syracuse, N.Y.

[22] Filed: Aug. 6, 1971

[21] Appl. No.: 169,641

[52] U.S. Cl.............. 178/5.4 SD, 325/331, 325/420
[51] Int. Cl......... H04n 9/50, H04b 1/16, H04b 1/68
[58] Field of Search.................... 178/5.4 R, 5.4 SD; 329/50; 325/329, 330, 331, 420

[56] References Cited

UNITED STATES PATENTS

| | | | |
|---|---|---|---|
| 3,152,305 | 10/1964 | Becker et al. | 325/331 |
| 2,999,154 | 9/1961 | Krause | 325/329 |
| 3,591,707 | 7/1971 | Abbott | 178/5.4 SD |

*Primary Examiner*—Robert L. Griffin
*Assistant Examiner*—George G. Stellar
*Attorney*—Richard V. Lang et al.

[57] ABSTRACT

A receiver for the reception of black and white or color television signals is disclosed which employs synchronous signal detection. Employing a highly linear synchronous detector of appropriately large bandwidth permits all portions of the signal to be detected at the original levels in the same detector without mutual interference. The detected portions are then separated at base band after detection by simplified filters. A single wide band lumped filter passing the whole channel at an intermediate frequency may be employed for inter-channel separation prior to detection. The design is intended for either discrete or monolithic solid state fabrication, the latter form permitting highly desirable realizations of critical circuits at low cost.

19 Claims, 4 Drawing Figures

INVENTOR:
WILLIAM PEIL,

BY Richard V. Lang
HIS ATTORNEY.

INVENTOR:
WILLIAM PEIL,

BY Richard V. Lang
HIS ATTORNEY.

TELEVISION RECEIVER INCORPORATING SYNCHRONOUS DETECTION

BACKGROUND OF THE INVENTION

1. Field of the Invention

The present invention relates to the design of a television receiver and more specifically to a television receiver incorporating synchronous detection.

2. Description of the Prior Art

Conventional television receivers have ordinarily employed largely separate processing for each of the principal components of the television signal. Thus, all portions of the signal are initially converted together by being mixed with a given high frequency wave to a lower contiguous band of frequencies (IF) suitable for signal amplification. The intermediate frequency amplifier, in which all signal components of a selected channel are initially amplified together, has a response, however, which is shaped to favor the luminance portion of the signal. Thus, a notch within the band of the selected channel is provided for reducing the gain of the sound carrier and a marked de-emphasis is also provided for reducing the gain of the in-channel chrominance signal. Because of the proximity of the chrominance signal to the luminance signal, this within-the-band filtering undesirably reduces the bandwidth of the luminance signal later applied to the luminance detector. The chrominance and sound signals are pre-attenuated well below the amplitude of the luminance portion of the signal to prevent undesirable beat products from developing between the chrominance and sound in the conventional nonlinear diode detector. The luminance signal can be detected without objectionable interference if the sound and chrominance are collectively attenuated 40 db. A narrow band filter is coupled to the luminance detector for taking off the reduced level chrominance signal which is then separately amplified to a suitable level and detected. The chrominance components are then added to the detected luminance components to recreate the individual color signals.

Since the in-channel filtering of the video signal requires a very sharp variation in amplitude response, a correspondingly large variation in phase response unavoidably occurs. Because of the need for narrow band filtering and amplifying of the chrominance information, the luminance and chrominance signals cannot be recombined unless delay lines are provided for re-establishing the original phase relationships between the respective luminance and chrominance signal components.

The sound channel is also taken off at the luminance detector at a relatively low level and after further amplification is separately detected by the FM detector.

In respect to both chrominance and sound, the available gain within the IF amplifier is not fully used. Reamplification is accordingly necessary for both of these portions of the signal. Within the channel filtering, the requirement for delay lines and redundant amplification thus appear to overly complicate the conventional television receiver.

SUMMARY OF THE INVENTION:

It is a principal object of the invention to provide a novel television receiver of improved design.

It is another object of the invention to provide a novel television receiver employing synchronous signal detection.

It is a further object of the invention to provide in a television receiver an improved arrangement for detection and signal separation.

It is another object of the invention to provide in a television receiver improved filtering and detection wherein all portions of a selected signal are applied together to a synchronous detector and separated at base band.

It is an additional object of the present invention to provide in a television receiver an improved arrangement for adaptively tuning a television receiver so that a selected signal falls within the desired portion of the IF filter pass band without IF filter pre-tuning.

It is a further object of the present invention to provide in a color television receiver an arrangement for reproducing the color signals which does not require delay lines nor band pass filtering of the chrominance information.

It is another object of the invention to provide an improved synchronous detector for use with a signal having vestigially modulated sidebands.

These and other objects of the invention are achieved in a combination comprising a source of vestigially modulated waves, a first four quadrant multiplier for synchronous detection of the vestigially modulated waves, a second four quadrant multiplier also coupled to said source for deriving a phase responsive error voltage, a synchronous oscillator which couples waves of suitable phase to the four quadrant multipliers for synchronous detection and for derivation of the error voltage, and finally a feedback network wherein the error voltage is used to maintain synchronism between the synchronous oscillator and the carrier of the vestigially modulated wave, the feedback network containing a low pass filter having a bandwidth not exceeding the bandwidth of the double side band portion of the vestigially modulated wave.

In a practical application of the invention to a television receiver, the vestigially modulated waves are derived from an intermediate frequency amplifier having a substantially flat frequency response over the luminance, chrominance and audio portions of a selected television signal and the synchronous detector employs a four quadrant multiplier in a doubly balanced configuration to minimize feedthrough of either input alone. Output utilization means are coupled to the synchronous detector for processing and reproducing the separate portions of the television signal. Since this separation now occurs at base band rather than at an intermediate frequency, the separation can be achieved by relatively simple filters which permit the formation of the color difference signals without the need for a delay line to bring the luminance and chrominance portions of the signal into coincidence.

In accordance with another aspect of the invention, the phase lock loop incorporates the high frequency oscillator operating to bring the intermediate frequency carrier into synchronism with the synchronous oscillator. When the reactive components in the tuned circuit of the synchronous oscillator and the reactive components forming the intermediate frequency filter are batch fabricated together, their errors may be made largely self-cancelling when one adjusts the frequency of the IF signal to fit their frequency characteristics.

This feedback arrangement minimizes the need for adjustment of the respective tuned circuits either during initial fabrication or subsequent use.

In accordance with a further aspect of the invention, the four quadrant multipliers employ three pairs of transistor differential amplifiers, the first two pairs being doubly balanced by the third pair. To achieve linearity, the synchronous oscillator is applied to the bases of the first pair of transistor differential amplifiers at an adequately high level to effect switching operation of the multiplier and the third differential amplifier to which the signals are applied is provided with a degenerative resistance in the emitter path.

BRIEF DESCRIPTION OF THE DRAWING:

The novel and distinctive features of the invention are set forth in the claims appended to the present application. The invention itself, however, together with the further objects and advantages thereof may be best understood by reference to the following description and accompanying drawings in which:

Figures 1, 3A, 3B:
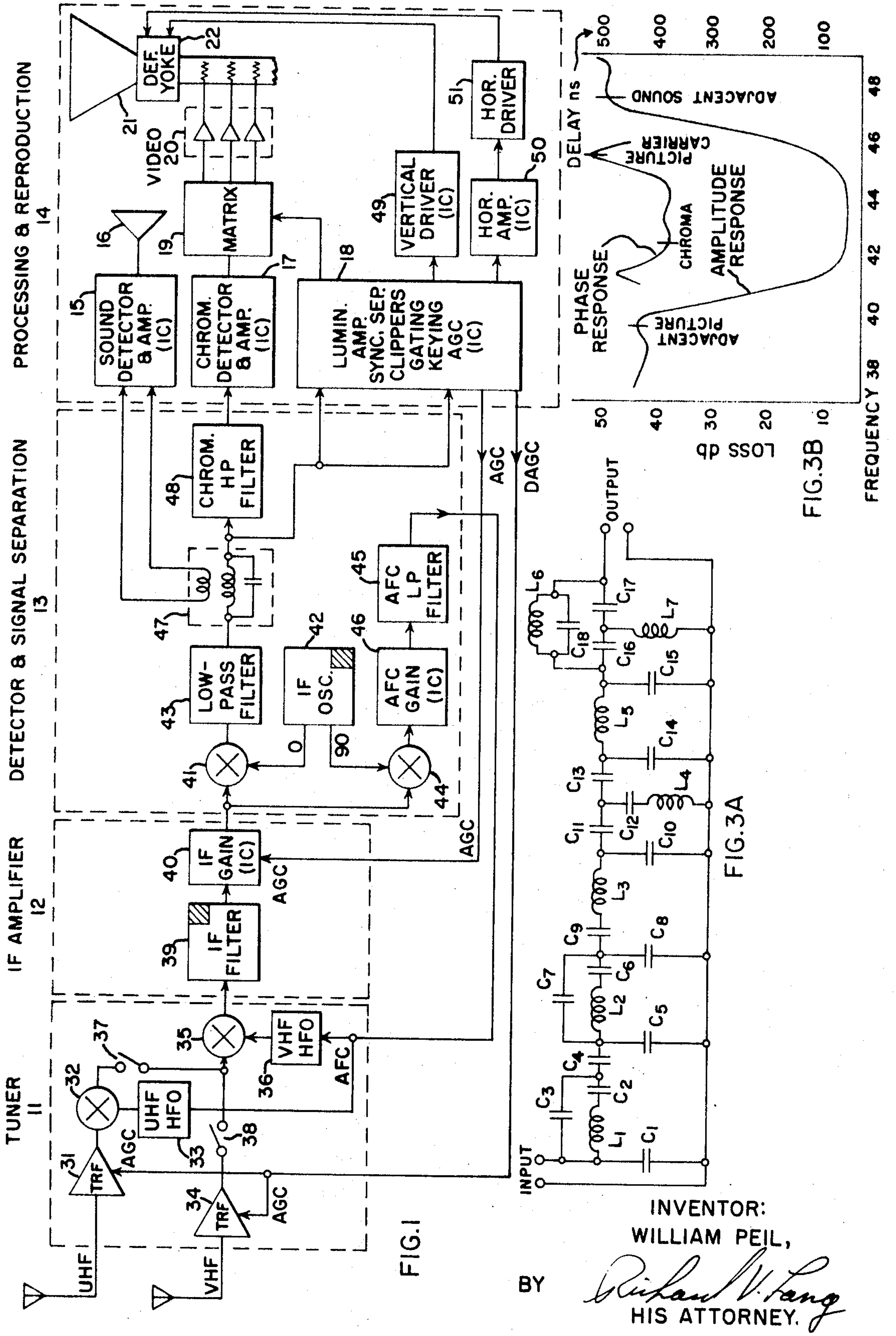
FIG. 1 is a block diagram of a television receiver embodying the invention, the larger dotted blocks illustrating an arbitrary four way functional partitioning of the television receiver, and the smaller blocks illustrating the novel synchronous detection and signal separation portion of the receiver and the organization of the major circuit portions of the television receiver incorporating this detection portion.
FIG. 3A is a circuit diagram of an IF filter suitable for use in the IF amplifier and FIG. 3B is a graph illustrating its performance.

DESCRIPTION OF THE PREFERRED EMBODIMENT:

Referring now to FIG. 1, a block diagram of a television receiver embodying the invention is shown. The television receiver is a superheterodyne whose principal functional blocks include a tuner 11, an IF amplifier 12, a detector and signal separator 13, signal processing and reproduction means 14 (all shown in dotted outline). The signal processing and reproduction means 14 in turn comprises a sound detector and amplifier 15 driving a loud speaker 16. The video processing includes a chrominance detector and amplifier 17, which in conjunction with a luminance amplifier (in element 18) and matrix 19 form separate R, G and B color signals, video amplifiers 20 for individual color signals which drive the signal grids of the cathode ray tube 21 and, finally, a control functions block 18, which derives the AGC voltages and performs the sundry control functions required to operate the cathode ray tube display, including deflections.

The first functional block of the television receiver is the tuner 11 which is intended for UHF and VHF reception. The UHF section consists of a first tuned RF amplifier 31 coupled to the UHF antenna, a mixer 32 and an associated high frequency oscillator 33. The VHF section comprises a tuned RF amplifier 34 coupled to a VHF antenna, a mixer 35 and a high frequency oscillator 36. The UHF elements 31, 32 and 33 are interconnected in a conventional manner and produce at the output of the mixer 32 a signal at intermediate frequency. The converted UHF signal is applied to the signal input of the VHF mixer 35 through a switch 37. In UHF operation, the oscillator 36 is inoperative and the mixer 35 operates as an amplifier at IF frequency. The VHF signals are amplified in the tuned radio frequency amplifier 34 and applied through a switch 38 to the input of the mixer 35 which mixes the signals with waves from the high frequency oscillator 36 to convert the signal to IF frequency. Manually operated means, not illustrated in FIG. 2, close either switch 37 or 38 for selecting UHF or VHF operation. Thus, UHF and VHF signals are converted in the tuner 11 to intermediate frequency for application to the following intermediate frequency amplifier 12.

The tuner 11 is provided with two customary manually operated controls and two internally operated controls. The manual controls are for band selection and channel selection while the internal controls are for automatic gain control of the radio frequency amplification in the tuner and for automatic frequency and phase control of the high frequency oscillators 33 and 36.

In a preferred embodiment of the invention, the automatic frequency and phase control voltage is derived from the subsequent synchronous detection stage 13 and is used to cause the intermediate frequency signal to fall into precise phase synchronism with local oscillations at intermediate frequency supplied to the synchronous detector 13. Thus, the local oscillators 33 and 36 together with the AFC network provide both signal acquisition and accurate phase locking operation.

In addition to the foregoing control functions, the tuner 11 performs the normal functions of selecting the desired band and the desired channel from the antenna, delivering the pre-selected signal at an amplified level and at a fixed frequency to the succeeding IF amplifier. To perform this function, the tuner should have a low noise input characteristic and should provide sufficient amplification to the pre-selected signal to bring it above any subsequent local or internal sources of noise. In the practical embodiments under consideration the tuner employs solid state active devices and is both electronically switched and tuned.

The IF amplifier 12 follows the tuner 11. It consists of a "lumped" selectivity IF filter 39 and an integrated circuit "lumped" gain element 40. The function of the IF amplifier is to reduce interchannel interference to an acceptable level and to provide the additional gain needed to bring the signal up to the level required for detection. Since the detector is a "low level" detector, the desired input signal is approximately 100 mv. peak to peak. The IF gain element 40 is provided with automatic gain control for aid in stabilizing the level of the video signal at the video detector, ordinarily to within a few db.

In accordance with the invention, the bandpass characteristic of the IF filter 39 is essentially flat throughout the selected signal, passing the luminance, the chrominance and the sound components without appreciable emphasis or de-emphasis. The filter 39 preferably has steep skirts at either edge of the bandpass characteristic for reducing adjacent and all other interchannel interference.

In FIG. 3A, the schematic diagram of a suitable intermediate frequency filter is shown including the component values in picofarads and microhenries. The filter has the amplitude response illustrated in one curve of FIG. 3B, and the phase response illustrated in the other curve of FIG. 3B. The filter is designed to have an input impedance of 1,000 ohms corresponding to the output impedance of a high frequency transistor and a 50 ohm output impedance suitable for application to the IF gain element 40. The amplitude response is such that throughout the picture and chrominance and sound the amplitude response is essentially flat, staying within 3 db, while the adjacent sound channel is down approximately 50 db and the adjacent picture is down approximately 40 db. It is not necessary to notch either the in channel sound as conventionally done, nor is it necessary to attenuate the in channel chrominance.

In the design of the filter, stop band attenuation is essentially provided by two groups of filter components and a delay compensation network is provided. The elements C3, L1 and C2 are tuned to resonate at 47.25 megacycles to provide an upper attenuation pole, and the series components C12, L4 are tuned to resonate at 39.75 megacycles to provide a lower attenuation pole. As illustrated in the dotted line characteristic of FIG. 3B, the phase response is held to a differential delay of approximately 50 nanoseconds across the chroma portion of the signal and 100 nanoseconds throughout the channel. This delay is achieved through the use of a compensating network comprising the elements L6, L7, C16, C17 and C18.

The above design in FIG. 3A is one in which component values have been selected to permit batch fabrication. One may, of course, use discrete fabrication or a combination of batch fabricated design with larger components being "outboarded".

In a preferred form, the "lumped" selectively IF filter 39 is batch fabricated by a printed circuit technique wherein inductors and capacitors are printed on two surfaces of a dielectric sheet or substrate. Since the frequency of the intermediate frequency filter 39 approximates the frequency of the local oscillator used in the subsequent synchronous detection process, the tuned circuit for the detector oscillator may also be similarly constructed and may be formed adjacent to the filter elements on the substrate so as to achieve a closer match of their respective frequencies.

Joint batch fabrication of the filter and oscillator tuned circuit elements brings about a "self-adaptive" compensation of frequency errors between the two. Self compensation occurs because the absolute frequency of the IF pass band is noncritical if the frequency of the synchronous oscillator remains coincident with the signal carrier frequency and means are provided for compensating for any joint drift of the two circuits as by retuning the high frequency oscillator to place the carrier signal at its proper place in the actual IF pass band.

In batch fabrication, a principal source of error is in the thickness of the substrate causing the values of the capacitors to vary inversely proportionately thereto. Jointly batch fabricating the filter and oscillator tuned circuits will cause the C's in the two circuits to vary in the same direction, causing the frequency shifts to occur in the same direction. In the present system these errors are self-cancelling. Generally, batch fabrication will make both the L's and C's self-compensating in respect to manufacturing tolerances, temperature coefficient effects and aging.

One may also achieve self-adaptive compensation by a suitable choice of discrete elements in a discrete realization of the two circuits. In discrete realizations, the more serious deviations occur in respect to the inductors. Thus, if they are of approximately the same value and physical construction, temperature effects and aging will also be self-compensating.

The detector and signal separation circuit 13 is coupled to the output of the intermediate frequency amplifier 12. It derives the sound, luminance, chrominance, and the required control signals (not usually separated from luminance) for operation of the cathode ray tube display.

As shown in FIG. 1, the detector and signal separation circuit 13 comprises a first four quadrant multiplier 41, which is a synchronous signal detector, intermediate frequency oscillator 42 for use in synchronous detection, a low pass filter 43 coupled to the output of the first four quadrant multiplier 41 from which the demodulated signal is taken, a second four quadrant multiplier 44, a low pass filter 45 for the automatic frequency and phase control voltage and an amplifier 46 for its amplification.

The four quadrant multipliers 41 and 44 each have two balanced inputs and a single balanced output. The four quadrant multiplier 41 has an intermediate frequency signal applied to one input and a wave of reference phase from the oscillator 42 applied to the other input. The four quadrant multiplier 44 also has an intermediate frequency signal applied to one input but has waves from the oscillator 42 applied to it in quadrature phase. In both cases the multipliers 41 and 43 perform a multiplication function in which the output is a d.c. base band quantity whose sign follows the rules of complex multiplication and a double frequency term. As noted, the four quadrant multiplier 41 (the in phase detector) recovers the video signal, the color subcarriers (3.58 mc.) and the audio signal subcarrier (4.5 mc.), while the four quadrant multiplier 44 (the quadrature detector) obtains the voltage required for automatic frequency and phase control of the high frequency oscillator in the tuner.

As indicated, the four quadrant multiplier 44 produces a d.c. voltage indicative of the difference in phase between the applied intermediate frequency signal and that of local oscillator 42 for automatic frequency and phase control. This voltage may be filtered in low pass filter 45 to remove higher frequency terms and noise and is amplified in the automatic frequency control amplifier 46. In the preferred embodiment illustrated in FIG. 1, the oscillator 42 is left uncontrolled by this feedback network and the active control connection is made to the high frequency oscillator 33 or 36. The oscillator 42 should be stable, however, and is made to have a natural frequency closely matching that of the intermediate frequency filter 39. Exact synchronism in frequency and phase between the intermediate frequency signal and the intermediate frequency oscillator is produced by automatic frequency and phase control of the high frequency oscillators 33 and 36 in the tuner 11. By this strategy, the intermediate frequency signal is made to conform to the phase of the synchronous oscillator 42, rather than vice versa.

As so far described, the preferred mode is to maintain automatic frequency and phase control of the high frequency oscillator alone and to dispense with the control of the synchronous oscillator 42. One may of course provide automatic frequency control of both oscillators. Since the synchronous oscillator should maintain a fixed relationship to the IF pass band, however, any control of the synchronous oscillator should be over a narrow range and tend to sustain this fixed relationship once the signal has been acquired.

Since the AFC control loop should be narrow band for tight phase control once a signal has been acquired by the television receiver, the control mechanism may require modification during the signal acquisition process. When initial channel selection provides a frequency which has an accuracy within the pull in range of the AFC loop, no further action is required. When this is not the case, then it is desirable to "dither" the AFC voltage until the incoming signal is acquired and locked at which time the dither can be automatically removed. One may also employ a variable bandwidth AFC loop which can be made wide for purposes of acquisition and then narrow for proper noise performance during normal operation. Dual filter action may be conveniently achieved by the use of a filter containing switching diodes which, during the presence of the widely fluctuating voltages on the AFC loop accompanying the acquisition process, temporarily switch out a portion of the filter to provide for wider band operation in the control loop.

Assuming synchronous operation of the oscillator 42, the television signal appears in the output of multiplier 41 in detected form. The luminous portion of the video signal is converted to base band; the chrominance portions of the video signal remain at subcarrier frequency; and the sound portion of the television signal now appears on a sound carrier of approximately 4.5 megahertz. The low pass filter 43 connected to the output of multiplier 41 removes second and higher order harmonics of the detected output waveform but passes all of the selected television channel with an essentially flat characteristic.

Thus, all four principal parts of the IF signal are applied to the synchronous detector 41 and, after detection, optional level shifting, and passage through the low pass filter 43, all are available for separate derivation and use. For such further signal separation, the block 13 further comprises a sound separator and trap 47 for separating the sound from the video and control portions of the signal and a chrominance high pass filter 48 which de-emphasizes the lower frequency portions of the luminance signal in the output connection to the chrominance processor. The sound separator and trap 47 is a series connected parallel resonant circuit, tuned to the sound carrier so as to trap out the sound from the video output connection and having a secondary winding coupled with the resonating inductor for deriving the sound signal output. The chrominance high pass filter 48 may be a simple r-c network - i.e., a coupling capacitor, which is too small to pass low frequency luminance components but large enough to pass the color subcarrier at its higher frequency, feeding a resistive load. The high pass filter 48 is connected to the output of the trap 47. It effectively deemphasizes the luminance portions of the video signal below color frequencies. Also connected to the output of the sound trap 47 are the luminance amplifier and control functions chip 18 for deriving luminance and sundry control functions from the detected video signal.

Because the chrominance information and the sound do not have to be attenuated with this type of detection, no adverse time delay is incurred between the luminance and chrominance information. In fact, the chrominance signals can be slightly advanced by the IF filter previously described (50 nanoseconds). No chrominance bandpass amplifier is required and the delay suffered by the chrominance information in this portion of the conventional TV set is eliminated. Taking into account the customary 50 nanosecond time advance in the transmitted signal for chrominance information, the chrominance signals emerge from the detector approximately 100 nanoseconds before the luminance signal. If the chrominance detector (17) has approximately 100 nanoseconds, differential delay over the luminance amplifier in (18), the component video signals will be inherently in time coincidence and no additional artificial delay line is required to bring them into time coincidence at the matrix 19.

The foregoing video detection arrangement represents a substantial departure from conventional detectors. The full television signal including sound, luminance and chrominance portions are applied to the detector 13 and all three are derived at essentially the same relative level as they appear in the initial signal. Previously, it was a common practice to avoid the simultaneous presence of these signals in a detector at any one time. This was because the signals would naturally interfere in detection. Applicants have discovered that a multiplier, when operated with an independent local oscillator, can be made to operate with such extreme linearity that all portions of a television signal can be treated in the multiplier simultaneously without adverse effect. While the block diagram in FIG. 1 generally illustrates the video detection configuration, FIG. 2 and the associated text describe an actual circuit and the additional features which achieve the required linearity in detection.

The processing and reproduction block 14 is the final block in the overall television receiver. It has input connections for sound, input connections for the chrominance and luminance portions of the video signal as well as for the control portions of the signal. The loud speaker 16 and the cathode ray tube 21, respectively, reproduce the sound and picture derived from the input signal.

The sound detector and amplifier 15 has its input coupled to the sound take off connection at the sound separator and trap 47. Since none of the detected signals are pre-attenuated in the IF amplifier, they emerge in the multiplier output at the levels established in the original signal. Since the sound is pre-attenuated some 30–40 db in the conventional television receiver, the sound signal ordinarily requires several additional stages of amplification before detection. In the present television receiver, the sound signal is only about 10 db below the levels of the detected video signal. Thus, while additional amplification is ordinarily required before application to a conventional high level FM detector, only a single stage of amplification is required. After detection, the sound is amplified to a suitable level for operation of the loud speaker 16. The sound detector and amplifier 15 may take the form of a single integrated circuit chip.

The detected video signal is processed by a chrominance demodulator 17, a luminance amplifier in chip 18, a matrix 19 and separate video drivers 20 which are coupled to the individual color grids of the cathode ray tube 21. The chrominance demodulator and amplifier 17 may take the form of a single chip fabricated by an IC technique. The luminance amplifier 18 may consist of one or two stages of video amplification since the gain requirement is small and may form a portion of the IC control chip 18. Since the chrominance signal is not preattenuated the customary 10 to 12 db prior to application to the video detector, it also emerges at a level approximately equal that of the luminance components, thus reducing the need for compensatory reamplification prior to demodulation. The demodulated chrominance signal which appears at the output of the demodulator 17 in the form of a pair of color difference signals is then mixed in the matrix 19 with the amplified luminance signal from 18 to obtain the separate R, G and B color signals. The color signals are then separately amplified in 20 and applied to the grids of the picture tube. The high power requirements for the individual video amplifiers of 20 normally dictate use of discrete active devices rather than IC fabrication.

The control functions for the cathode ray tube are provided by the element 18, preferably a single integrated circuit chip also providing luminance amplification. The detected television signal is applied to this control chip for operation of the clipping, gating, keying circuitry for control of the cathode ray tube. AGC circuitry is also included for control of the IF and RF amplifier. Additional chips in turn controlled by 18 are provided for vertical deflection as shown at 49 and for "horizontal amplification" as shown at 50. The horizontal driver amplifier 51, because of higher power requirements for horizontal deflection, normally employs discrete solid state components. The vertical and horizontal drivers 49, 51 are then connected to their respective deflection yokes 22. The video signal and control circuitry operate the picture tube 21 in a conventional manner in the reproduction of the video signal, and will not be further discussed.

Reviewing the processing and reproduction block 14, it may be noted that the components for sound, video and control functions have been very substantially simplified by virtue of the fact that the sound and chrominance portions of the signal do not need to be reamplified after detection in the detector 13 since they are not pre-attenuated prior to detection. The elements 15, 17, 18, 49, 50 in the block 14 represent portions of the television receiver which can be separately partitioned into separate chips.

Figure 2:
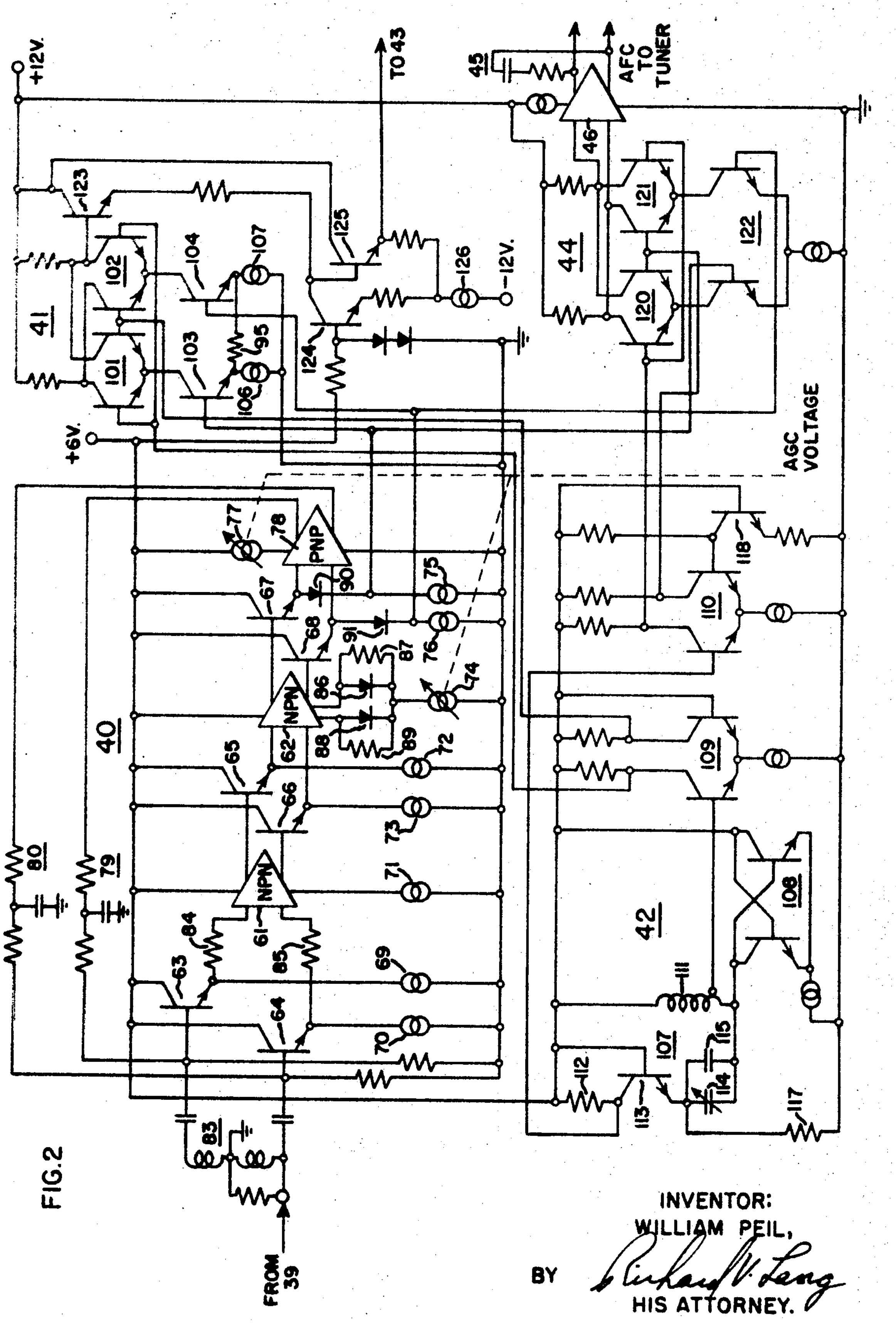
FIG. 2 is a circuit diagram of the IF gain portion of the IF amplifier and the synchronous detectors.

In FIG. 2, a more detailed diagram is provided of portions of the intermediate frequency amplifier 12 and detector and signal separator 13. The intermediate frequency amplifier 12 as seen in FIG. 1 includes the intermediate frequency filter 39 and the IF amplifier 40. As earlier pointed out, the intermediate frequency filter 39 differs from conventional IF filters for television receivers in that it is a lumped filter containing all the IF selectivity and in that it passes all the components of a selected channel without appreciable attenuation. The IF amplifier 40 is coupled to the output of the "lumped" IF filter 39 and supplies an amplified signal to the input of the detector and signal separator 13. The IF amplifier has balanced input connections, balanced output connections and balanced d.c. interstage signal coupling throughout.

The IF amplifier consists of two differential amplifier stages 61 and 62 supplemented by three pairs of interstage buffer amplifiers 63–64, 65–66, 67–68, current supply elements 69–76, and a feedback network comprising the components 77–80.

A balanced input to the IF amplifier is obtained from the IF filter 39 by means of a "balun" 83. The balun may take the form of a coil having two matched bifilar windings. Connections to the windings are made by a pair of ungrounded terminals and a ground connection. When an input signal is applied between one ungrounded terminal and ground, causing signal current in one winding, an equal signal current is induced in the other winding, producing at the other ungrounded terminal a corresponding signal, which is of equal magnitude but out of phase. The balun produces an output signal, which is balanced to ground. The balanced signal is coupled from the balun 83 through a pair of coupling capacitors to the transistor bases of the first pair of input buffer amplifiers 63, 64. (From this point on, the IF amplifier employs only d.c. signal coupling.)

The paired buffer amplifiers 63, 64 are emitter followers having their collectors directly connected to a source of bias potentials and their emitters, from which a balanced output signal is derived, connected respectively to current sources 69, 70. The output signal taken from the emitters of buffer amplifiers 63, 64 is then fed through a pair of degenerating resistances 84, 85 to the balanced signal input connections of the first differential amplifier 61.

The first differential amplifier 61 consists of two transistors (not individually illustrated) having their emitters connected in common to a current source 71; having their bases connected to the resistances 84, 85 for the input signal connection; and their collectors, from which the balanced output signal is derived, coupled through suitable loads to a source of bias potentials.

The current sources 69 through 77 are conventional for integrated circuit fabrication and are arranged to be disposed in the emitter leads of the individual emitter follower buffer amplifiers and difference amplifiers. Each current source comprises a transistor whose collector is connected to the emitter of the stage being controlled and whose emitter is grounded. The base of the current source transistor is led to a voltage divider network for establishing a pre-assigned current operating point for the controlled stage. Stabilization of the voltage at the input junction of the current source transistor is provided by a second transistor connected in a diode configuration (with its collector and base joined together) whose junction shunts the input junction of the current source transistor. The circuit permits one to establish a pre-assigned current level in each active circuit and aids in achieving a high degree of linearity. The differential amplifier 61 may be a conventional chip and its current source may be formed integrally as a part of the chip. The buffer amplifiers and their current sources may also be formed as a part of the same chip.

Following the first differential amplifier 61, a second pair of buffer amplifiers 65, 66 is provided for coupling the balanced output signal from the first differential amplifier 61 to the second differential amplifier 62. The buffer amplifiers 65, 66 consist of two transistors connected in emitter follower configuration. Their bases are connected to the output terminals of differential amplifier 61; their collectors are directly connected to a source of bias potentials; and their emitters, from which a balanced output for the second differential amplifier 62 is derived, are connected to current sources 72, 73.

The second differential amplifier 62 is similar to the first differential amplifier. It consists of two differentially connected transistors each having their bases connected to the output of the buffer amplifiers 65, 66, and their collectors, from which a balanced output signal is applied to output buffer amplifiers 67, 68, coupled through suitable load resistances to a source of bias potentials. Their emitters are separated, however. One emitter is led through forwardly biased diode 86, shunted by resistance 87 to current source 74. Similarly, the other emitter is led through forwardly biased diode 88, shunted by resistance 89 to the same current source 74.

The current source 74, in a manner distinguishing the operation of differential amplifier 62 from differential amplifier 61, is subject to automatic gain control by the subsequent detection and signal separation stage 13.

The third pair of buffer amplifiers 67, 68 couple the balanced output signal from the second differential amplifier 62 through voltage dropping diodes 90, 91 to the following detection stage 13.

The differential amplifiers 61, 62 provide the voltage gain of the intermediate frequency amplifier, each having approximately 30 db of gain. The buffer amplifiers 63, 64, 65, 66, 67, 68 serve the primary function of buffering the individual differential amplifiers by providing a high input impedance and low output impedance. They do not directly contribute to the voltage gain of the amplifier. The purpose of this arrangement is to keep the gain essentially flat from low frequency (2 mc.) through the IF frequency (46 mc). If this is not done and there is appreciably more gain at frequencies below IF, then the detector can be overloaded with low frequency noise. Normally, this is not of concern in conventional IF amplifiers which provide for band shaping of some sort with each gain stage. In the design of broad band IC gain blocks, chosen to reduce the need for continually going on and off the chip, control of the out of band gain is an additional consideration. Introducing emitter followers between gain stages prevents the decreasing input impedance (with increasing frequency) from appearing across the resistive loads in the output of the previous stage, thus keeping the IF gain flat over an extended range.

The gain of the intermediate frequency amplifier is provided with automatic control. The operating currents of the transistors in the differential amplifiers 61 and 62 and the buffer amplifiers 63 through 68 are controlled by the individual current sources previously listed and except for the current source 74 are not subject to automatic control. They thus set the operating points and thus fix the gain that is made subject to gain control action. The amplifier provides a total gain of approximately 60 db and means are provided for achieving approximately this range of control. The automatic gain control initially reduces the gain of the second differential amplifier 62 by reducing its quiescent current. The gain in the first IF amplifier is reduced by driving it into saturation. Thus, the gain reduction of the intermediate frequency amplifier is achieved by forward AGC of the first stage and reverse AGC of the second stage.

The AGC operation in the second IF amplifier stage is as follows. The AGC control voltage derived from block 14 is a d.c. voltage proportional to the signal strength. This quantity is supplied to the current source 74 to control the common mode current supplied to the emitters in the second IF amplifier 62. A reduction in emitter current produces a reduction in gain in amplifier 62 by virtue of the concurrent loss of transconductance ($g_m$).

The resistor diode networks 86, 87, 88, 89 comprise a current actuated degenerative network which extends the natural gain reduction of amplifier 62 in the following manner. Under quiescent current conditions (maximum gain) diodes 86 and 88 are forward biased and provide a moderately low impedance path between the emitters of the differential amplifier 62. As this current is decreased during AGC action the diodes draw negligible current and the moderately high impedance of resistors 87 and 89 are introduced and represent an appreciable amount of emitter degeneration for the differential amplifier 62. This overall operation is usually characterized as "reverse AGC".

AGC action in the first stage is realized by driving the differential amplifier 61 into saturation. This is accomplished by reducing the current in amplifier 78 through its current source 77 and driving the common mode d.c. input voltage of amplifier 61 toward $B^+$ (+6 volts). The resistor network 84, 85 enhances the natural saturation AGC action of amplifier 61 in the following way. Under quiescent conditions (maximum gain) the input impedance of amplifier 61 is high and resistor 84 and 85 represent a negligible series loss pad. As amplifier 61 is driven into saturation during AGC action, its input impedance lowers drastically and resistors 84 and 85 become an appreciable loss pad.

In addition to the desired AGC action, the presence of resistors 84 and 85 tends to linearize the gain of the IF amplifier under conditions of high input signal levels by causing most of the input signal to appear across the degenerative resistors 84, 85.

The intermediate frequency amplifier illustrated in FIG. 2 is not in itself a part of the present invention. It is the subject of a second application by the present inventor being filed concurrently herewith. The intermediate frequency amplifier which has been so far described is fully d.c. coupled throughout and processes the intermediate frequency signal in a balanced fashion from input to output. The amplifier is characterized by both accurate AGC control and also by an accurate phase response which holds the signal in mutual phase accuracy as between higher and lower frequency components throughout a selected channel. Accordingly, while an illustrative intermediate frequency amplifier has been described in some detail, it should be obvious that it might be replaced by a second amplifier having the same symmetry and accuracy in phase and amplitude response. The phase and amplitude accuracy requirement is set by the requirements for synchronous detection in the subsequent video detector 41.

The detection and signal separation circuit 13 will now be considered in detail. As viewed in FIG. 2, the detection circuit includes a first, or I, four quadrant multiplier 41 which synchronously detects the signal arriving at IF carrier frequency, and a second, or Q, four quadrant multiplier 44, which aids in the generation of a voltage for maintaining synchronism between the carrier of the IF signal and the local oscillator 42. In a preferred embodiment, the synchronous local oscillator 42 is not actively controlled but is of predetermined initial accuracy and stability in relation to the IF filter pass band. Automatic frequency control and precise phase synchronism is achieved through application of the control voltage derived from the Q detector 44 and applied to the high frequency oscillators in the tuner 11. As earlier mentioned, the detector and signal separation block 13 also includes suitable filters 43, 47, 48 for separately deriving the sound, chrominance and luminance signals; the control functions for operation of the display 21, and finally, the requisite elements for operation of the automatic frequency control loop, including the gain element 46 and filter element 45.

Referring to FIG. 2, the I detector 41 is a double balanced four quadrant multiplier comprising a first pair of differential amplifiers 101, 102 subject to double balancing by means of a pair of transistor control or input amplifiers 103, 104, themselves differentially connected. The paired emitters of the first differential amplifier 101 are connected to the collector of the first input amplifier 103 while the paired emitters of the second differential amplifier 102 are connected to the collector of the input amplifier 104, these connections providing the double balanced operation. A small valued resistance 95 is introduced between the emitters of the input amplifiers 103, 104 for degeneratively linearizing the input characteristic of the multiplier. The emitter leads of the transistor amplifiers 103, 104 are in turn connected to current sources 106, 107 which supply an essentially constant current in the same manner as illustrated in respect to the intermediate frequency amplifier stages.

The four quadrant multiplier 41 "multiplies" the TV signal derived from the IF amplifier by a synchronous wave derived from the IF oscillator 42 to obtain a detected output which contains the full TV signal. The TV signal from the IF amplifier 12 is obtained by the pair of d.c. connections to the emitters of the final emitter followers 67, 68 of the IF amplifier. These connections are applied in push-pull to the bases of the transistor input pair 103, 104. The signal from the local oscillator 42 is applied to the paired bases of the differential amplifiers 101 and 102 in push-pull fashion. The local oscillator is at reference phase with respect to the carrier of the intermediate frequency signal and the oscillator output is set sufficiently high to switch the stages 101 and 102 sharply between conductive states. The detected output containing the full television signal appears at the collector pairs. After a level shift the signal is applied through the filter 43 for further distribution between the sundry processing and reproduction means illustrated in block 14 of FIG. 1.

The local oscillator provides a high level wave at IF carrier frequency at both reference and quadrature phase. The wave at reference phase is provided to the I detector and the wave at quadrature phase is provided to the Q detector. The local oscillator 42 includes a resonant tank circuit shown generally at 107 having two connection points in mutual phase quadrature; a difference amplifier 108 having feedback connections arranged to sustain oscillations in the tank circuit; and a pair of difference amplifiers 109, 110 whose inputs are coupled to the respective quadrature points on the tank circuit acting as buffer amplifiers for the respective in phase and quadrature phase waves. The resonant tank circuit 107 comprises a tapped inductor 111 shunted by a series circuit comprising a resistor 112, a transistor 113 and a pair of mutually shunted capacitors 114, 115. The transistor 113 has its emitter coupled to one plate of each of the capacitors and its collector connected to one terminal of the resistance 112. The emitter of the transistor 113 is returned to ground through a resistance 117. The base of the transistor 113 is connected to the remaining terminal of the resistance 112. The tank circuit 107 thus forms a generally parallel resonant circuit wherein the tapped inductor 111 resonates with the capacitor made up from the elements 114, 115. The transistor 113 serially connected with the resistance 112 has the effect of lowering the apparent impedance of the series resistance 112 and raises the Q of the tank circuit proportionately. The connection point of the collector to the resistance 112 thus provides a voltage from the tank circuit which is approximately in quadrature with the voltage derived from the tap on the inductor 111. The differential amplifiers 109 and 110 are conventional and are connected to suitable sources of bias potential and through separate unnumbered current sources to ground. An additional transistor 118 is provided having its collector connected to one base of the differential amplifier 110 for d.c. balancing the differential amplifier 110 against current in the transistor 113 coupled to the other base of the differential amplifier.

The Q detection circuit 44 is generally similar to the I detection circuit 41. The Q detector 44 comprises a pair of differential amplifiers 120, 121 doubly balanced by a third differential amplifier 122. The paired emitters of the first differential amplifier 120 are connected to one collector of the differential amplifier 122, while the paired emitters of said second differential amplifier 121 are connected to the other collector of the differential amplifier 122. The paired emitters of the differential amplifier 122 are fed through a current source to ground.

The Q detector develops an AFC voltage. For the sensitivity required to achieve precise phase control, it operates with the immediate frequency signal in quadrature to the output from the synchronous oscillator 42 and produces a unidirectional control voltage at its output. The 90° phase shifted output from a local oscillator is applied at a high level to the bases of the differential amplifiers 120 and 121. The level is selected to be high enough to cause these two differential amplifiers to switch sharply between conductive states. The signal from the intermediate frequency amplifier is applied in push-pull across the lower rank differential amplifier 122. The four quadrant multiplier thereupon multiplies the two applied signals together and produces at the collector output a wide band product term, mathematically the algebraic product of the interbase voltage at the differential amplifiers 120 and 121 and the emitter current at the balancing differential amplifier 122. The wide band product term is a function of the phase error between the incoming intermediate frequency signal and the phase of the synchronous oscillator 42. The detected voltage is amplified by the automatic frequency control gain element 46 and filtered in the network 45, which may be a small capacitor and resistor in series. The control voltage is then applied to control the frequency of the high frequency oscillators 33, 36 in the tuner. This mode of frequency control forces the intermediate frequency signal into correspondence with the frequency and phase of the local oscillator 42.

The foregoing automatic frequency control network is capable of maintaining precise phase control between the frequency of the signal applied to the I detector and the phase of the local oscillator 42 while at the same time providing an approximately 40 – 50 kilocycle initial acquisition range. If a wider range of acquisition is sought, then one may introduce an additional circuit for acquisition as earlier suggested, which causes the automatic frequency voltage to hunt over a wider range until acquisition is achieved. The acquisition circuit may be of conventional form. A d.c. component appears at the collectors of the I detector during synchronous operation and disappears when synchronism is lost. The acquisition circuit may be coupled to the unused collector of the I detector through a level sensing circuit arranged to sense the absence of this d.c. component and to initiate a sweep voltage coupled to the AFC bus. The sweep voltage is made sufficiently large to cause the high frequency oscillators of the tuner to swing through the range of error to be expected with repeated channel selections. Optionally, one may provide for manual fine tuning of the high frequency oscillators which permits the operator to achieve the higher precision in tuning.

The detected full television signal appears at the collector pairs of the I detector for further processing and reproduction. Since the d.c. level of the detector collectors is at approximately 9 volts, it is ordinarily desirable to shift the d.c. level of the detected video signal down to typically 2 volts (at zero signal). This is done by means of the level shift network. The circuit illustrated is a wide band circuit which has an essentially flat response over a television channel and is of conventional design. The level shift network comprises three transistors 123, 124, 125 all in emitter follower configuration. The first two transistors 123, 124 are serially connected between a positive and a negative source, both of 12 volts. The collector of the transistor 123 is coupled to the positive source with its emitter load resistance connected to the collector of the transistor 124, the emitter of the transistor 124 being connected through its emitter load resistance to a constant current source 126 which is in turn connected to the negative voltage source. The base of the emitter follower transistor 123 is connected to the output collector of the I detector for application of the detected signals. The base of the transistor 124 is connected to a voltage reference network comprising a voltage dropping resistance and a pair of diodes. The voltage reference network is arranged to establish the base of the transistor 124 slightly above ground. The output transistor 125 has its collector directly connected to the 12 volt source and its emitter connected through an emitter load resistance to the constant current source 126. The base of the transistor 125 is coupled to the collector of the transistor 124 for obtaining the signal voltage. The output signal is then derived at the emitter of the transistor 125. The d.c. output level is adjusted by choice of the values of the three emitter follower load resistances. Typically, a 2 volt zero signal level is desirable. The gain of the overall circuit is approximately 2.

It is highly desirable to use a completely balanced IF amplifier configuration and a doubly balanced detector in order to keep the overall system stable and not subject to deleterious parasitic coupling from the later stages to the input or earlier stages. This is especially important if the entire gain and detection function are to be realized on one monolithic chip.

The batch fabricated filter 39 illustrated in FIG. 3A may have the following exemplary component values:

| Capacitance Value in pf. | | Inductance Value in µH. | |
|---|---|---|---|
| C 1 | 1.11 | L1 | 4.00 |
| C 2 | 4.84 | L2 | 2.92 |
| C 3 | 6.85 | L3 | 4.00 |
| C 4 | 4.62 | L4 | 1.40 |
| C 5 | 9.65 | | |
| C 6 | 6.91 | L5 | 0.038483 |
| C 7 | 4.90 | L6 | 0.87102 |
| C 8 | 40.4 | | |
| C 9 | 3.85 | | |
| C10 | 57.0 | | |
| C11 | 46.9 | | |
| C12 | 4.01 | | |
| C13 | 3.54 | | |
| C14 | 7.10 | | |
| C15 | 68.3 | | |
| C16 | 7.6966 | | |
| C17 | 7.6966 | | |
| C18 | 344.5 | | |

A television receiver incorporating the present invention may be principally constructed from a collection of monolithic integrated circuit chips. The portions of a television receiver illustrated in FIG. 2 and in particular the intermediate frequency gain element 40, the I detector 41, the Q detector 44 and the oscillator 42 are all intended for fabrication upon a single monolithic chip with certain electrical components "outboarded" such as the balun 83 and its associated coupling capacitors, the capacitors in the feedback network 79 and 80 and the tank circuit 107 for the oscillator 42. The tank circuit 107 is preferably fabricated, as earlier dscribed, in the same manner as the filter 39. If a batch fabricated filter is employed, the tank circuit is preferably fabricated on a common substrate. If a discrete filter is employed, the inductor 111 should be matched as earlier taught, to the inductors of the filter 39. Other integrated circuit configurations may be used in a television receiver of this form. A suitable color demodulator and processor is described in U. S. Pat. No. 3,591,707 to H. W. Abbott. A suitable vertical deflection circuit is described in U. S. Patent application Ser. No. 49,777 to J. E. Harris and W. Peil entitled "Electromagnetic Deflection Apparatus".

The filtering required to isolate the components of the selected television signal and the means required to keep the luminance and chrominance portions of the signal, which must be later combined to form the individual color signals, in time coincidence are greatly simplified in a television receiver incorporating the present invention.

In particular, the IF filter 39 need not contain any within-the-channel traps for the sound or chrominance components but may apply sound, chrominnance and luminance to the synchronous detector at the same relatively high signal levels. By transforming the signal components within the selected channel to base band, the synchronous detector transforms these components to a frequency domain in which the components may now be more advantageously separated. Typically, the low pass filter at the output of the I detector may consist of a single filter capacitor which strongly attenuates the second harmonic of the IF frequency at 88 megacycles. Its roll off will only slightly affect the upper limits of the detected signal. The chrominance high pass filter may consist of an undersized coupling capacitor. No other input filter is necessary to remove the luminance components from a chrominance detector of the type described in the cited Abbott patent. Filtering at the output of the chrominance detector may also consist of simple low pass RC networks. The luminance amplifier may operate with simple low pass RC filters at the input and/or the output. Thus, expensive or complicated networks may be completely avoided in achieving signal separation within the channel. Furthermore, filtering at base band is readily achieved with IC fabrication technology.

There is, however, an equally important simplification in the ease with which one can meet the requisite timing relationships. In prior color television receivers, it has been necessary to introduce a sharply tuned band pass filter for the chrominance portions of the signal. Ordinarily, this filter produces approximately 700 nanoseconds of differential delay as between the chrominance and the luminance components. With the elimination of this band pass filtering, the bulk of the differential delay has been eliminated and the need for a large delay line obviated.

Since the disparity in timing between the two portions of the video signal is quite small in an arrangement utilizing these principles, the precise timing relationship may be achieved by relatively simple adjustments of the filter circuits without requiring a separate delay line. The transmitted signal contains video information in which the chrominance information is advanced approximately 50 nanoseconds with respect to the luminance information. At the same time the low pass filtering into and out of the chrominance channel (after video detection) may be productive of approximately 200 nanoseconds delay for the chrominance components while the luminance components may be subjected to an 80 nanosecond delay. Thus, the differential delay between the luminance and chrominance components subsequent to detection may bring about a differential time delay of 120 nanoseconds, the chrominance lagging. In view of the 50 nanosecond advance of the transmitted chrominance signal, this difference of 120 nanoseconds is reduced to approximately 70 nanoseconds, the chrominance still lagging. This timing error may be tolerated since it is quite small, or may be almost completely eliminated by taking advantage of a desirable steeper skirt to suppress the adjacent channel sound in the IF filter which naturally delays the luminance information. In this case, the differential time delay characteristic of the IF filter may easily produce a 50 nanosecond additional delay to the luminance signal bringing about almost perfect ( $<20$ ns) nominal time coincidence between the luminance and chrominance signals. The IF filter illustrated approximates this nominal differential delay response.

The customary bandwidth of the luminance information in a typical color television receiver is approximately 2.5 to 3. megahertz and this bandwidth is utilized in the exemplary arrangement. The customary bandwidth of the chrominance information is 600 kilohertz. It is possible to apply the concepts described above to operation either at the usual narrow bandwidth or to the wider 1.2 megacycle chrominance bandwidth which corresponds more closely to the color information originally transmitted. The delays indicated above assume this wide bandwidth mode of operation.

The resolution of the reproduction system sets a practical upper limit on the timing accuracy requirement. Assuming a high quality system having 350 horizontal resolution elements, the assigned time interval between resolution elements will be 100 nanoseconds. Under these conditions, one might expect a displacement of less than 50 nanoseconds to be barely discernible. In a conventional color television receiver, the resolution is often closer to 250 horizontal resolution elements. Here an error of 100 nanoseconds would normally be tolerable. By adjustment of the time delays in the associated filters as by adjustment of the cut-off frequencies of the chrominance high pass filter, the luminance and chrominance low pass filters and the differential time delay of the IF filter, one may achieve a highly accurate time relationship between the video components without the need for a separate delay line.

While the illustrative embodiment employs an I and Q detection arrangement wherein the synchronous oscillator provides both an in-phase and a quadrature wave by suitable coupling into the resonant tank circuit, it should be apparent that other means may be employed for producing the necessary phase relationships. The Q detector (44), which is used to derive the phase sensitive error voltage, requires mutually orthogonal input components. The I detector on the other hand requires that the two inputs be in phase for synchronous detection. There are, therefore, a number of arrangements which will satisfy these two operating requirements. For instance, one may employ an oscillator which produces an output having a single phase and introduce a single 90° phase shift network either between that oscillator and the I or the Q detector input; or one may also introduce a 90° phase shift network into the signal input of either the I or the Q detector while the signal derived from the local oscillator remains unchanged; or one may use other variations with multiple phase shift networks of less than 90° phase shift. The illustrated arrangement, however, is simple and effective.

What is claimed as new and desired to be secured by Letters Patent of the United States is:

1. In combination a. a first four quadrant multiplier for linear synchronous detection of a vestigially modulated wave having at least one accompanying modulated subcarrier, said linearity preventing mutual interference between the respective detected modulations, said multiplier having two inputs and an output, b. a second four quadrant multiplier for deriving a phase responsive error voltage having two inputs and an output, c. a source of vestigially modulated waves having a carrier of predetermined frequency and at least one accompanying subcarrier coupled to the input of each of said four quadrant multipliers, d. a synchronous oscillator at said predetermined frequency having an output coupled to the other input of said first four quadrant multiplier for effecting synchronous detection of said vestigially modulated wave and converting said modulated subcarrier to subcarrier frequency, and having an output coupled to the other input of said second four quadrant multiplier for deriving a phase responsive error voltage, e. a feedback network to which said phase responsive error voltage is coupled for maintaining phase synchronism between said oscillator and said carrier, said feedback network containing a low pass filter having a bandwidth not exceeding the bandwidth of the double side band portion of said vestigial side band signal, and f. output utilization means coupled to the output of said first four quadrant multiplier for separating and processing said vestigial modulation and said subcarrier modulations.

2. The combination set forth in claim 1 wherein said source of vestigially modulated waves comprises:

a. a source of waves of controllable phase,
b. a source of said vestigially modulated waves at a second carrier frequency, and
c. means for mixing said waves of controllable phase with said waves at a second carrier frequency to produce waves of said predetermined carrier frequency, said feedback network being connected to said source of waves of controllable phase for maintaining phase synchronism between said oscillator and said carrier.

3. The combination set forth in claim 1 wherein said four quadrant multipliers are doubly balanced to minimize feedthrough of either input quantity to the output thereof.

4. The combination set forth in claim 3 wherein said four quadrant multipliers each comprise two pairs of transistor differential amplifiers doubly balanced by a third transistor differential amplifier coupled to control the emitter currents of the respective members of said first pair of differential amplifiers.

5. In a television receiver the combination comprising:

a. an intermediate frequency amplifier to which television signals converted to an intermediate frequency are applied, said intermediate frequency amplifier having a substantially flat frequency response over the luminance, chrominance and audio portions of a selected television signal,
b. a synchronous detector for said intermediate frequency signals for deriving the luminance at base band, the chrominance on its sub-carrier and the audio signal on its carrier comprising a linear first four quadrant multiplier having two inputs and an output, said linearity preventing mutual interference between said respective television signal portions, one input being coupled to the output of said intermediate frequency amplifier,
c. an oscillator having a frequency suitable for synchronous detection of said intermediate frequency signal coupled to the other input of said first four quadrant multiplier,
d. a second four quadrant multiplier for deriving a phase responsive error voltage having two inputs and an output, one input being coupled to said intermediate frequency amplifier and the other input being coupled to the output of said synchronous oscillator; and one of the inputs being in quadrature with respect to the corresponding input in said first four quadrant multiplier,
e. a feedback network to which said phase responsive error voltage from said second multiplier output is coupled for maintaining phase synchronism between said oscillator and the intermediate frequency carrier of said television signal, said feedback network containing a low pass filter having a bandwidth exceeding the bandwidth of the double side band portion of said vestigial side band signal, and
f. output utilization means coupled to the output of said first synchronous detector for processing and reproducing said luminance and audio portions of said television signal.

6. The combination set forth in claim 5 wherein said two four quadrant multipliers are doubly balanced to minimize feedthrough of either input quantity to the output thereof.

7. The combination set forth in claim 6 wherein said four quadrant multipliers each comprise two pairs of transistor differential amplifiers doubly balanced by a third transistor differential amplifier, coupled to control the emitter currents of the respective members of said first pair of differential amplifiers.

8. The combination set forth in claim 7 wherein said oscillator is connected to the bases of said two pairs of transistor differential amplifiers and said oscillator output is a constant amplitude wave of adequately high level to effect switching operation of said multiplier.

9. The combination set forth in claim 8 wherein the transistor of said third differential amplifiers are provided with a degenerative resistance in the emitter path to insure linear operation in respect to a signal applied to the bases thereof.

10. The combination set forth in claim 9 wherein a source of constant current is provided for supplying emitter current to the transistors of said third differential amplifier.

11. The combination set forth in claim 5 wherein:

a. a frequency converter is provided for converting applied television signals to intermediate frequency, said converter comprising a high frequency oscillator controllable with respect to frequency and phase, and wherein
b. said feedback network is coupled to said high frequency oscillator for the control thereof.

12. The combination set forth in claim 11 wherein said intermediate frequency oscillator and said intermediate frequency amplifier have reactive components whose deviations from nominal are matched to reduce mistuning from initial manufacturing tolerances and subsequent aging and ambient conditions.

13. The combination set forth in claim 12 wherein said matched reactive components of said intermediate frequency amplifier include inductive and capacitive components which are manufactured in a common continuous batch process.

14. The combination set forth in claim 5 wherein said output utilization means comprises means for separately deriving said luminance and said chrominance portions of said television signal after synchronous detection to base band to minimize the differential delay between luminance and chrominance components.

15. The combination set forth in claim 14 wherein said means for separately deriving said luminance and said chrominance portions of the television signal are RC networks.

16. The combination set forth in claim 14 wherein said utilization means comprises a chrominance detector and low pass filters for said detected chrominance components and a low pass filter for said luminance components, the differential delay between said detected chrominance components and said luminance components after synchronous detection not exceeding 150 nanoseconds.

17. The combination set forth in claim 16 wherein said low pass filters for said luminance and chrominance components are RC networks.

18. The combination set forth in claim 16 wherein said intermediate frequency filter produces a differential delay as between the luminance and chrominance portions of the signal, said luminance portion lagging, whereby the accumulated differential delay between detected chrominance components and luminance components subsequent to application to said intermediate frequency filter does not exceed 100 nanoseconds.

19. The combination set forth in claim 18 wherein the accumulated differential delay between detected chrominance components and luminance components subsequent to application to said intermediate frequency filter approximate the differential delay between the transmitted chrominance components and the transmitted luminance components so as to bring the two into approximate ( <50 nanoseconds) correspondence.

* * * * *